United States Patent
Lin et al.

(10) Patent No.: US 11,436,017 B2
(45) Date of Patent: Sep. 6, 2022

(54) DATA TEMPORARY STORAGE APPARATUS, DATA TEMPORARY STORAGE METHOD AND OPERATION METHOD

(71) Applicant: XIAMEN SIGMASTAR TECHNOLOGY LTD., Xiamen (CN)

(72) Inventors: Bo Lin, Xiamen (CN); Wei Zhu, Xiamen (CN); Chao Li, Xiamen (CN)

(73) Assignee: SIGMASTAR TECHNOLOGY LTD., Fujian (CN)

( * ) Notice: Subject to any disclaimer, the term of this patent is extended or adjusted under 35 U.S.C. 154(b) by 0 days.

(21) Appl. No.: 17/103,036

(22) Filed: Nov. 24, 2020

(65) Prior Publication Data
US 2021/0157594 A1    May 27, 2021

(30) Foreign Application Priority Data
Nov. 27, 2019  (CN) .......................... 201911180934.7

(51) Int. Cl.
*G06F 9/38* (2018.01)
*G06F 9/30* (2018.01)
*G06F 12/0868* (2016.01)

(52) U.S. Cl.
CPC ........ *G06F 9/3802* (2013.01); *G06F 9/30145* (2013.01); *G06F 9/3855* (2013.01); *G06F 12/0868* (2013.01)

(58) Field of Classification Search
None
See application file for complete search history.

(56) References Cited

U.S. PATENT DOCUMENTS

2020/0265306 A1\*  8/2020  Zhang ................... G06F 17/153

\* cited by examiner

*Primary Examiner* — Charles Rones
*Assistant Examiner* — Ryan Dare
(74) *Attorney, Agent, or Firm* — Edell, Shapiro & Finnan, LLC (57) ABSTRACT

A data temporary storage apparatus includes a moving unit coupled to a first storage unit and multiple second storage units. The moving unit receives a moving instruction having contents including a read address, a destination address and a predetermined moving rule. The moving unit further executes the moving instruction to fetch input data by row from the first storage unit according to the read address, and to temporarily stores one after another in an alternate and sequential manner the data in each row to each of the second storage units indicated by the destination address. The data moving, data reading and convolution approaches of the present invention implement in parallel data moving and a convolution operation, achieving a ping-pong operation of convolution units and enhancing convolution efficiency, while reducing memory costs since configuring two data storage spaces in a memory is not necessary.

11 Claims, 10 Drawing Sheets

DATA TEMPORARY STORAGE APPARATUS, DATA TEMPORARY STORAGE METHOD AND OPERATION METHOD

This application claims the benefit of China application Serial No. 201911180934.7, filed on Nov. 27, 2019, the subject matter of which is incorporated herein by reference.

BACKGROUND OF THE INVENTION

Field of the Invention

The invention relates to a data computing technology, and more particularly to a data temporary storage apparatus, a data temporary storage method, and an operation apparatus.

Description of the Related Art

Deep learning is one critical application technology for developing artificial intelligence, and is extensively applied in fields including computer imaging and voice recognition. Convolutional neural networking (CNN) is a deep learning efficient recognition technology that has drawn much attention in the recent years. It performs convolutional operations and vector operations of multiple layers with multiple feature filters by directly inputting original image or data, further generating highly accurate results in aspects of imaging and voice recognition. The scale of filters can range from small-block scales such as 1×1 and 3×3 to 5×5 and 7×7 or even 11×11 large-scale convolution operation blocks, and thus the convolution operation is also a quite performing-consuming operation.

In seek of classification accuracy, the depth as well as complexity of CNN models are ever-increasing; for example, the number of layers of a depth residual neural network (ResNet) is as many as 152 layers. In certain reality application scenarios such as mobile or embedded apparatuses, such enormous and complex models face problems of insufficient memory capacities and response delays; for example, horrendous consequences can be resulted if the response speed of a pedestrian detection system of an auto-driving vehicle has a slow response speed. Therefore, as it become difficult to implement large-scale CNN, CNN researches have been carried out in aim of developing small and efficient CNN models. For example, Google has proposed a small and efficient CNN model, MobileNet, which has a reduced model size while preserving model performance and at the same time improves model speed.

However, a fundamental unit of MobileNet is a depthwise separable convolution that is factorized convolutions, that is, factorized into two smaller operations including a depthwise convolution and a pointwise convolution. Different input channels are first individually convoluted using the depthwise convolution, and outputs are then combined using the pointwise convolution. The overall performance of such approach is about the same as that of one standard convolution, with however the amount of computation and the amount of model parameters significantly reduced. Nonetheless, such approach also brings negative effects. Since the depthwise convolution does not repeatedly use feature data as the standard convolution, that is, feature data read from a memory is only used once and then discarded, which tremendously aggravates the bandwidth stress upon a memory, and so it is also hard to combine the convolutional structure thereof with the current convolutional accelerator technology.

Therefore, there is a need for a convolution operation method with respect to depthwise convolution and a data temporary storage method, which are capable of achieving large-scale convolution operation blocks without needing additional hardware resources, and improving the utilization rate of convolution units and the utilization rate of temporary storage units.

SUMMARY OF THE INVENTION

In view of the issues of the prior art, it is an object of the present invention to provide a data temporary storage apparatus and an operation method for improving the prior art.

The present invention provides a data temporary storage apparatus configured to temporarily store input data in a first storage unit to a plurality of second storage units. The data temporary storage apparatus includes a moving unit, individually coupled to the first storage unit and the second storage units, and configured to receive a moving instruction. The moving instruction having contents including a reading address, a destination address and a predetermined moving rule. The moving unit is further configured to execute the moving instruction to fetch input data by row from the first storage unit according to the read address, and to temporarily store one after another in an alternate and sequential manner the input data of each row to each of the second storage units indicated by the destination address.

The present invention further provides a data temporary storage method for temporarily storing input data in a first storage unit to a plurality of second storage units. The data temporary storage method includes: receiving a moving instruction, the moving instruction having contents including a reading address, a destination address and a predetermined moving rule; and executing the moving instruction to fetch the input data by row from the first storage unit according to the read address, and to temporarily store one after another in an alternate and sequential manner the input data in each row to each of the second storage units indicated by the destination address.

The present invention further provides an operation method applied to a convolution operation apparatus configured to perform a convolution operation on input feature data. The input feature data is stored in a storage unit and corresponding to a data structure consisting of I*J sets of planar data of N channels, wherein N, I and J are positive integers. The convolution operation apparatus includes a first buffer, a second buffer and a first convolution unit. The operation method includes: writing, in the input feature data, N sets of data corresponding to a $j^{th}$ position of an $i^{th}$ row in the N channels to the first buffer; writing, in the input feature data, N sets of data corresponding to a $(j+1)^{th}$ position of the $i^{th}$ row in the N channels to the second buffer; and reading data corresponding to an $n^{th}$ channel from the first buffer and the second buffer to the first convolution unit to perform the convolution operation, where i is a positive integer smaller than or equal to I, j is a positive integer smaller than or equal to J, and n is a positive integer smaller than or equal to N.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 6a to FIG. 6c are schematic diagrams of data storage in individual memories according to an embodiment of the present invention;

FIG. 8a to FIG. 8c are schematic diagrams of data reading and convolution operation processes according to an embodiment of the present invention;

DETAILED DESCRIPTION OF THE INVENTION

Details of the present invention are further given by way of specific embodiments with the accompanying drawings below for a person skilled in the art to better understand the technical solutions of the present invention.

The background of the present invention is first given in brief below.

Figure 1:
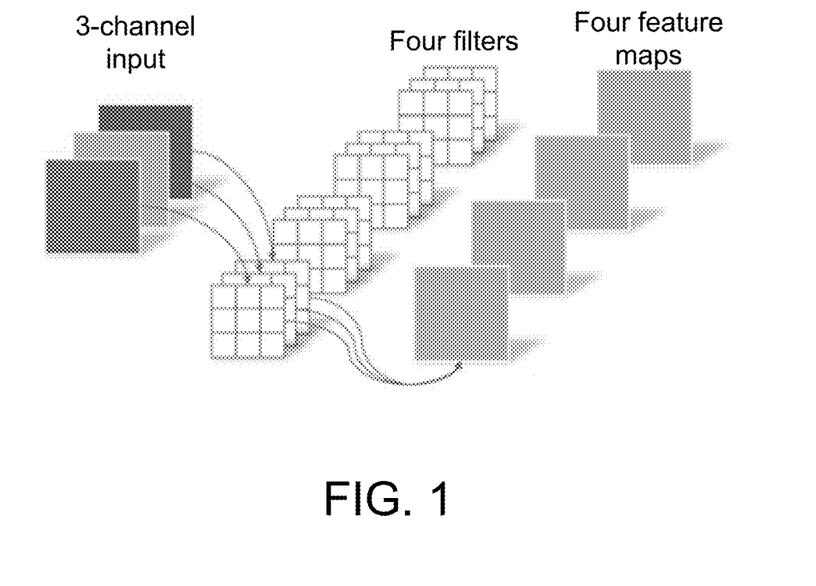
FIG. 1 is a schematic diagram of a standard convolution operation.

FIG. 1 shows a schematic diagram of a standard convolution operation. Data inputted into a convolution operation apparatus in general includes two types of data—feature data and filter data. The feature data is usually original input data such as images and voices or output data of upper-layer convolutions. A 5×5-pixel, three-channel RGB color input image is taken as an example herein, wherein the number of channels is 3 (red, green and blue), and thus the shape thereof is 5×5×3. The filter data refers to the so-called feature filter data or convolution kernel data, and is a set of parameter values for identifying certain features of an image; a common model is 1×1, 3×3, 5×5, 7×7 or even 11×11, and the channels of a convolution kernel should be consistent with the channels of feature data. Herein, a common 3×3 convolution kernel is taken as an illustrative example, wherein the number of the convolution kernel is 4 (i.e., the number of output channels is 4), and thus the shape of the convolution kernel is four 3×3×3. The process of the convolution operation is: four sets of 3×3×3 filter data sequentially move on 5×5×3 feature data to thereby generate a sliding window on the feature data, wherein the interval of each move is a stride, the stride is smaller than a shortest width of the filter, and the convolution operation in a size of one filter is performed on corresponding data in the window for each move. Taking FIG. 1 for example, the stride is 1, and so a 3×3×3 convolution operation is performed for each move when the filter data moves on the feature data, and the final result is referred to as a feature value.

Figure 2:
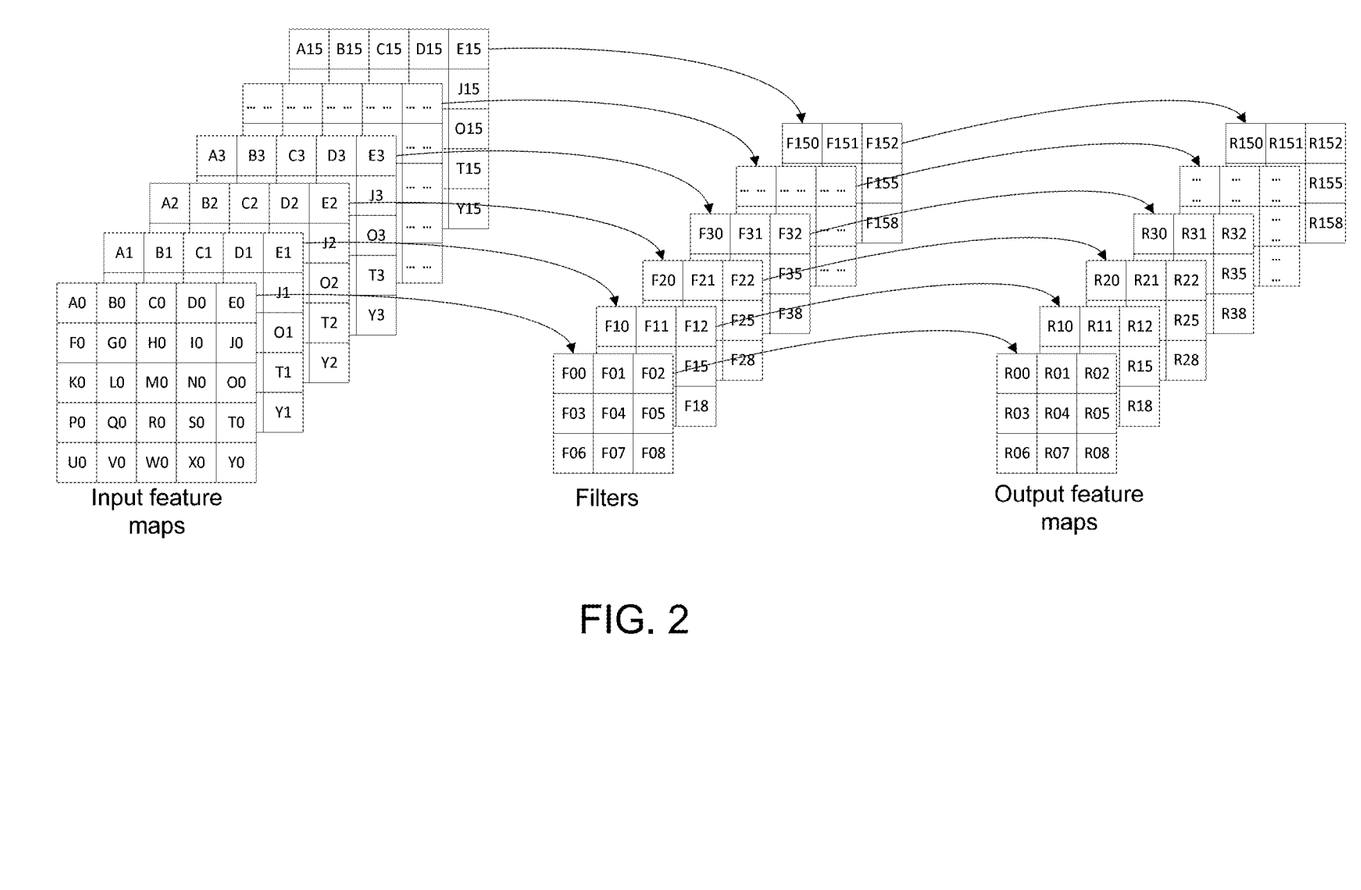
FIG. 2 is a schematic diagram of a depth convolution operation according to an embodiment of the present invention.

Also refer to FIG. 2 showing a schematic diagram of a depth convolution operation according to an embodiment of the present invention. For example, the feature value of the first window is R00=((A0×F00)+(B0×F01)+(C0×F02)+(F0×F03)+(G0×F04)+(H0×F05)+(K0×F06)+(L0×F07)+(M0×F08))+(A1×F10)+(B1×F11)+(C1×F12)+(F1×F13)+(G1×F14)+(H1×F15)+(K1×F16)+(L1×F17)+(M1×F18)+((A2×F20)+(B2×F21)+(C2×F22)+(F2×F23)+(G2×F24)+(H2×F25)+(K2×F26)+(L2×F27)+(M2×F28)), and so forth, so that a set of feature values R00 to R08 are generated. Because there are four sets of filters, the feature values generated have four channels R00 to R08, R10 to R18, R20 to R28 and R30 to R38, that is, the shape is 3×3×4.

Unlike a general convolution that each convolution kernel performs an accumulation operation on all channels of an input image, one convolution kernel of the depthwise convolution is responsible for one channel, and one channel is convoluted by only one convolution kernel. As the depthwise convolution shown in FIG. 2, for one 5×5-pixel, 16-channel input image (the shape is 5×5×16), the depthwise convolution is performed in a first sliding window when the convolution operation is performed within a two-dimensional plane; that is, the feature value R00=(A0×F00)+(B0×F01)+(C0×F02)+(F0×F03)+(G0×F04)+(H0×F05)+(K0×F06)+(L0×F07)+(M0×F08). The number of convolution kernels is the same as the number of channels of the feature data (the channels and the convolution kernels are in one-on-one correspondence), and so when the stride of the image in FIG. 2 is 1, 16 3×3 feature maps are generated after the operation.

However, in the depth convolution, unlike a general convolution, the feature data cannot be repeatedly convoluted by multiple feature filters; that is, the feature data read from a memory is convoluted only once and then discarded, which tremendously aggravates the bandwidth stress upon the memory. Moreover, for an AI accelerator, due to the large number of multiply-accumulate circuits (MAC) of convolution kernels, unlike a general convolution that needs a smaller feature bandwidth and enhances the utilization rate of MACs by increasing the number of feature filters, the bit width of a data temporary storage apparatus for storing feature data needs to be increased in order to enhance the utilization rate of the MACs. As a result, enhancing the utilization rate of MACs for depth convolution increases the layout stress of a chip. In addition, taking the MobileNet for example, the filter size of a depth convolution is 3×3, that is, only 9 points are accumulated for each convolution. However, for a general convolution, an exclusive temporary storage apparatus still needs to be provided to store intermediate accumulation results, and the data bit width of the intermediate results is associated with the number of feature filters, hence increasing the costs of the temporary storage apparatus.

On this basis, the inventor of the present invention has brought forth the following data temporary storage apparatus, data temporary storage method, operation apparatus and operation method.

Figure 3:
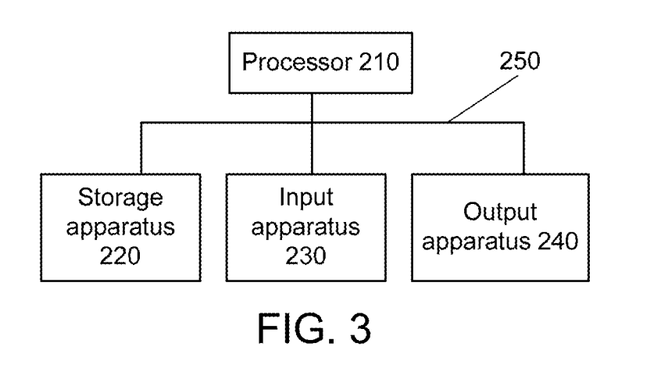
FIG. 3 is an exemplary electronic apparatus for implementing a data temporary storage apparatus and temporary storage method, an operation apparatus and an operation method of the embodiments according to an embodiment of the present invention.

Refer to FIG. 3 showing an exemplary electronic apparatus for implementing the data temporary storage apparatus, data temporary storage method, operation apparatus and operation method of the embodiments according to an embodiment of the present invention.

As shown in FIG. 3, an electronic apparatus 200 includes one or more processors 210, one or more storage apparatuses 220, one or more input apparatuses 230, and one or more output apparatuses 240; these elements are coupled to each other by a bus system 250 and or a connecting mechanism of another form. It should be noted that, the elements and structures of the electronic apparatus shown in FIG. 3 are illustrative rather than restrictive, and the electronic apparatus may also include other elements and structures according to requirements.

The processor 210 may be a central processing unit (CPU) or a processing unit in another form and having data processing capabilities and/or instruction executing capabilities, and is capable of controlling other elements in the electronic apparatus 200 so as to perform expected functions.

The storage apparatus 220 may include one or more computer program products. The storage apparatus 220 may include various types of computer-readable storage media, for example, volatile memories and/or non-volatile memories. The volatile memory may include, for example, random access memories (RAM) and/or high-speed temporary memories (caches). The non-volatile memories may include, for example, read-only memories (ROM), hard drives and flash memories. One or more computer program instructions may be temporarily stored in the computer-readable storage medium, and the processor can run the program instruction(s) to realize client functions and/or other expected functions (implemented by the processor) in the following embodiments of the present invention. Various applications and various types of data, for example, various types of data used and/or generated by the application, may be further stored in the computer-readable storage medium.

The input apparatus 230 may be an apparatus for the user to input an instruction, and may include one or more of a keyboard, a mouse, a microphone and a touch screen.

The output apparatus 240 may output various signals (e.g., an image or an audio) to a user, and may include one or more of a display and a speaker.

Figure 4:
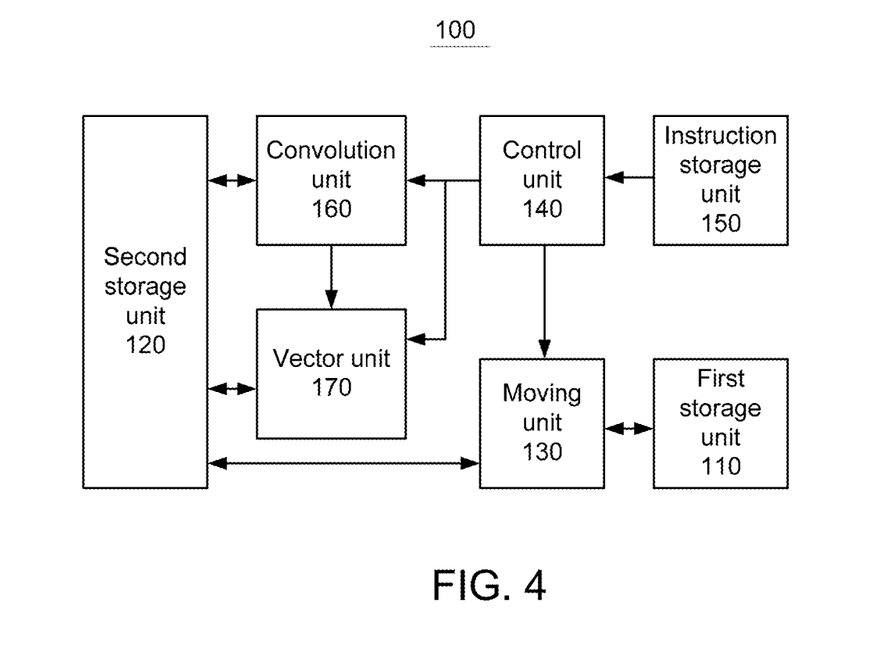
FIG. 4 is a schematic diagram of an operation apparatus according to an embodiment of the present invention.

Refer to FIG. 4 showing a schematic diagram of an operation apparatus 100 according to an embodiment of the present invention. FIG. 4 depicts a data temporary storage apparatus according to an embodiment of the present invention, wherein the data temporary storage apparatus is used in the operation apparatus 100 shown in FIG. 4 to perform a convolution operation.

As shown in FIG. 4, a data temporary storage apparatus is configured to temporarily store input data in a first storage unit 110 to a plurality of second storage units 120. The first storage unit 110 is exemplified by an external memory, and the second storage unit 120 is exemplified by an internal memory in the illustrative description below. In addition, a person skilled in the art may set the allocated positions of the first storage unit 110 and the second storage unit 120 according to actual requirements. The data temporary storage apparatus includes a moving unit 130, which is individually coupled to the first storage unit 110 and the plurality of second storage units 120. The moving unit 130 is configured to receive an instruction, which has contents including a read address, a destination address and a predetermined moving rule. The moving unit 130 is further configured to execute the moving instruction to fetch the input data by row from the first storage unit 110 according to the reading address and the predetermined moving rule, and temporarily store one after another in an alternate and sequential manner the data in each row to each of the second storage units 120 indicated by the destination address according to the predetermined moving rule.

For example, as shown in FIG. 4, the moving unit 130 is configured to temporarily store one after another in a sequential manner the data on the same position of each row to the same second storage unit 120, and temporarily store one after another in a sequential manner the data on a different position of each row to another row different from the same row in the same second storage unit 120, or temporarily store one after another in a sequential manner to the same row of another second storage unit 120 different from the same second storage unit 120.

Figure 5:
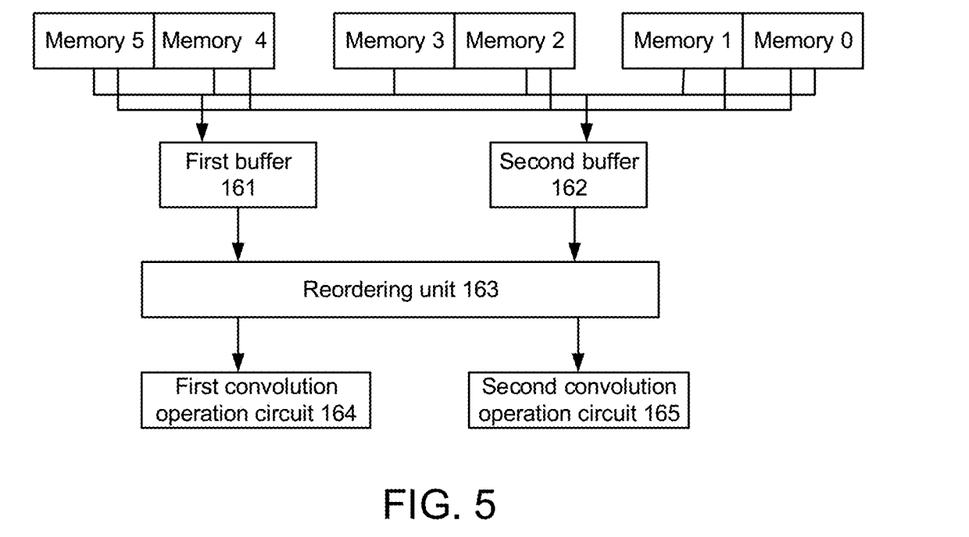
FIG. 5 is a schematic diagram of a memory and a convolution unit according to an embodiment of the present invention.

Refer to FIG. 5 showing a schematic diagram of memories and a convolution unit according to an embodiment of the present invention. Specifically, as shown in FIG. 4 and FIG. 5, for a convolution operation in which the size of a filter is 3×3, 6 second storage units 120 may be used, for example, memory 0 to memory 5 in FIG. 5, wherein each of the memories has an independent read/write port. The moving unit 130 is in charge of moving data from the first storage unit 110 to memory 0 to the memory 5, and the moving unit 130 realizes storage format conversion according to the instruction of the control unit 140 during the moving process and then sequentially stores the data according to a starting address provided in the moving instruction.

Taking the input data in FIG. 2 for example, the input data in FIG. 2 is stored in the first storage unit 110, and corresponds to a data structure consisting of 5×5 planar data of 16 channels. When moving the input data (feature data) shown in FIG. 2 under the control of the moving instruction, the moving unit 130 stores data A0 to A15 to the 1st row of memory 0, stores data B0 to B15 to the 1st row of memory 1, stores data C0 to C15 to the $2^{nd}$ row of memory 0, stores data D0 to D15 to the $2^{nd}$ row of memory 1, and so forth, until all data of all channels of the 1st row of the feature data in FIG. 2 is stored to memory 0 and memory 1.

Then, all data of all channels of the $2^{nd}$ row of the feature data in FIG. 2 is moved using the same moving approach to memory 2 and memory 3, and all data of all channels of the $3^{rd}$ row of the feature data in FIG. 2 is stored according to the same moving approach to memory 4 and memory 5. At this point, the first three rows of the feature data is completely moved, and exactly matches with height 3 of the sliding window generated by the filter.

Finally, the process above is cyclically iterated to continue storing all data of all channels of the $4^{th}$ row of the feature data in FIG. 2 according to the same moving approach to memory 0 and memory 1, and storing all data of all channels of the $5^{th}$ row of the feature data in FIG. 2 according to the same moving approach to memory 2 and memory 3. Because the feature data of this embodiment exists in only five rows, all data is completely moved at this point.

Figure 6A:
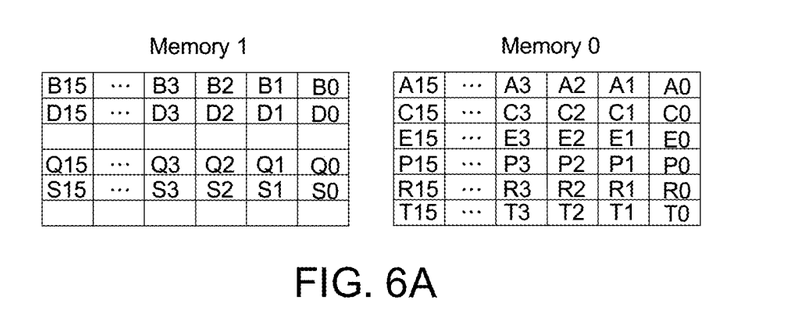
Figure 6B:
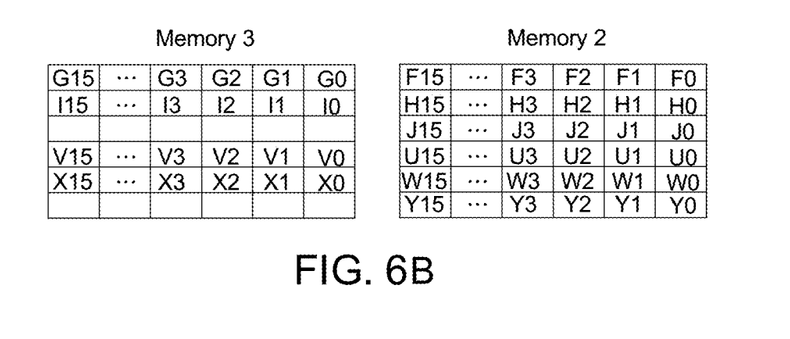
Figure 6C:
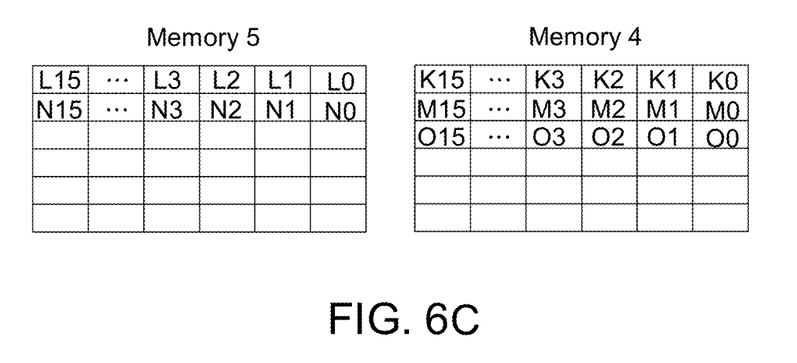

Refer to FIG. 6a to FIG. 6c showing schematic diagrams of data storage of individual memories according to an embodiment of the present invention. The data stored in the memories is eventually as shown in FIG. 6a to FIG. 6c. For other embodiments with larger feature data, the process above can be continued to store the data in each of the memories. It should be noted that, to store data in each row, storage starts from the next address and cannot conflict with the storage address of the data of the last row.

In the data temporary storage apparatus of this embodiment, when the input data (features) is temporarily stored from the first storage unit to the second storage unit, the input data is fetched by row, and the data in each row is temporarily stored one after another in an alternate and sequential manner in each of the second storage units indicated by the destination address. More specifically, the data on the same position in each row is temporarily stored one after another in a sequential manner to the same row of the same storage unit, and the data on the different position in each row is temporarily stored one after another in a sequential manner to another row different from the same row of the same second storage unit, or is temporarily stored one after another in a sequential manner to the same row of another second storage unit different from the same second storage unit. With the data temporary storage apparatus provided by this embodiment, 16 convolution operation results can be generated in each clock cycle by hardware in the following convolution operation, thereby significantly enhancing convolution operation efficiency.

Further, to enhance operation efficiency, the moving unit 130 can further simultaneously execute the moving instruction during the process of executing the convolution operation.

Figure 7:
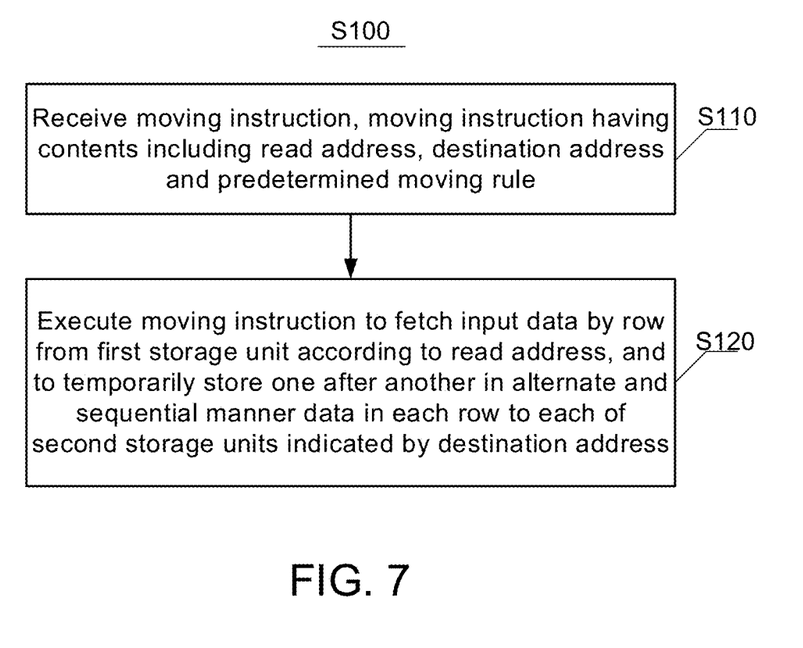
FIG. 7 is an illustrative flowchart of a data temporary storage method according to an embodiment of the present invention.

Refer to FIG. 7 showing an illustrative flowchart of a data temporary storage method S100 according to an embodiment of the present invention. The data temporary storage method S100 is for temporarily storing input data in a first storage unit to a plurality of second storage units. The data temporary storage method is suitable for the data temporary storage apparatus described above, wherein the specific structure of the data temporary storage apparatus can be referred from the disclosure above, and is omitted herein.

As shown in FIG. 7, the data temporary storage method S100 includes the following steps.

In step S110, a moving instruction is received, the moving instruction having contents including a read address, a destination address and a predetermined moving rule.

In step S120, the moving instruction is executed to fetch input data by row from the first storage unit according to the read address and the predetermined moving rule, and data in each row is stored one after another in an alternate and sequential manner to each of the second storage units indicated by the destination address according to the predetermined moving rule.

For example, the data on the same position in each row may be temporarily stored one after another in a sequential manner to the same row of the same second storage unit, and the data on the different position in each row may be temporarily stored one after another in a sequential manner to another row different from the same row of the same second storage unit, or may be temporarily stored one after another in a sequential manner to the same row of another second storage unit different from the second storage unit.

Specific details of the approach for the data temporary storage can be referred from the approaches for the data temporary storage enumerated in the description above, and are omitted herein.

With the data temporary storage approach used in the data temporary storage method of this embodiment, 16 convolution operation results can be generated in each clock cycle by hardware in the following convolution operation, thereby significantly enhancing convolution operation efficiency.

To enhance the operation efficiency, the second storage unit may include a first input port and a second input port. The step of temporarily storing one after another in an alternate and sequential manner the data in each row to each of the second storage units indicated by the destination address further includes: selectively temporarily storing one after another in an alternate and sequential manner the data in each row to each of the second storage units indicated by the destination address through the first input port and the second input port.

To further enhance the operation efficiency, the data temporary storage method may include simultaneously executing the moving instruction during the process of performing the convolution operation.

An operation apparatus according to another embodiment of the present invention is described with reference to FIG. 4.

As shown in FIG. 4, the operation apparatus 100 includes a first storage unit 110, a plurality of second storage units 120, a moving unit 130, a control unit 140, an instruction storage unit 150, a convolution unit 160 and a vector unit 170. The function of the moving unit 130 is the same as that described in the data temporary storage apparatus and the data temporary storage method above, and the specific details can be referred from the associated description above and are thus omitted herein.

The instruction storage unit 150 is configured to store an associated instruction, e.g., a moving instruction or an operation instruction. The control unit 140 is configured to fetch the instruction from the instruction storage unit 150 according to a clock cycle. The convolution unit 160 and the vector unit 170 are core operation modules of the operation apparatus 100, and more particularly, the convolution unit 160 includes therein a large amount of multiply-accumulate arrays configured to perform convolution operations. More specifically, the convolution unit 160 receives an operation instruction that includes a read address, a destination storage address and predetermined convolution kernel data, executes the operation instruction to read the input data on addresses of all the second storage units 120 corresponding to clock cycles by following the sequence of the clock cycles according to the read address so as to form column data corresponding to each clock cycle, performs the convolution operation on the data of each column and the convolution kernel data of every two adjacent clock cycles, and stores the operation result to the second storage unit 120 corresponding to the destination storage address.

For example, as shown in FIG. 4 and FIG. 5, the convolution unit 160 includes a control sub-unit (not shown), a first buffer 161, a second buffer 162, a reordering unit 163, a first convolution operation circuit 164 and a second convolution operation circuit 165.

The control sub-unit is configured to read the data at the $N^{th}$ address of all the second storage units in an $M^{th}$ clock cycle to obtain $P^{th}$-column data, and temporarily store the $P^{th}$-column data to the first buffer 161. The control sub-unit is further configured to read the data at the $(N+1)^{th}$ address of all the second storage units 120 in an $(M+1)^{th}$ clock cycle to obtain $(P+1)^{th}$-column data, and temporarily store the $(P+1)^{th}$-column data to the second buffer 162.

The reordering unit 163 reorders and combines the $P^{th}$-column data and the $(P+1)^{th}$-column data inputted therein by following a predetermined rule according to convolution operation requirements to obtain first combined column data and second combined column data. The reordering unit 163 outputs the first combined column data to the first convolution operation circuit 164, and outputs the second combined column data the second convolution operation circuit 165. The first convolution operation circuit 164 and the second convolution operation circuit 165 perform convolution operations on the first combined column data and the second combined column data, respectively, where M, N and P are positive integers greater than or equal to 1.

It should be noted that, the $P^{th}$-column data and the $(P+1)^{th}$-column data may include only data of one row, or may include data of multiple sub-rows—the latter is taken as an example for illustrations in the description below.

More specifically, the $P^{th}$-column data includes data of multiple $P^{th}$ sub-rows, and the $(P+1)^{th}$-column data includes data of multiple $(p+1)^{th}$ sub-rows. The reordering unit 163 is configured to reorder and combine data in at least one row of the multiple $(P+1)^{th}$ sub-rows and the data of multiple $P^{th}$ sub-rows to obtain the first combined column data; the reordering unit 163 is further configured to reorder and combine data in at least one row of the multiple $P^{th}$ sub-rows and the data of the multiple $(P+1)^{th}$ sub-rows to obtain the second combined column data.

Figure 8A:
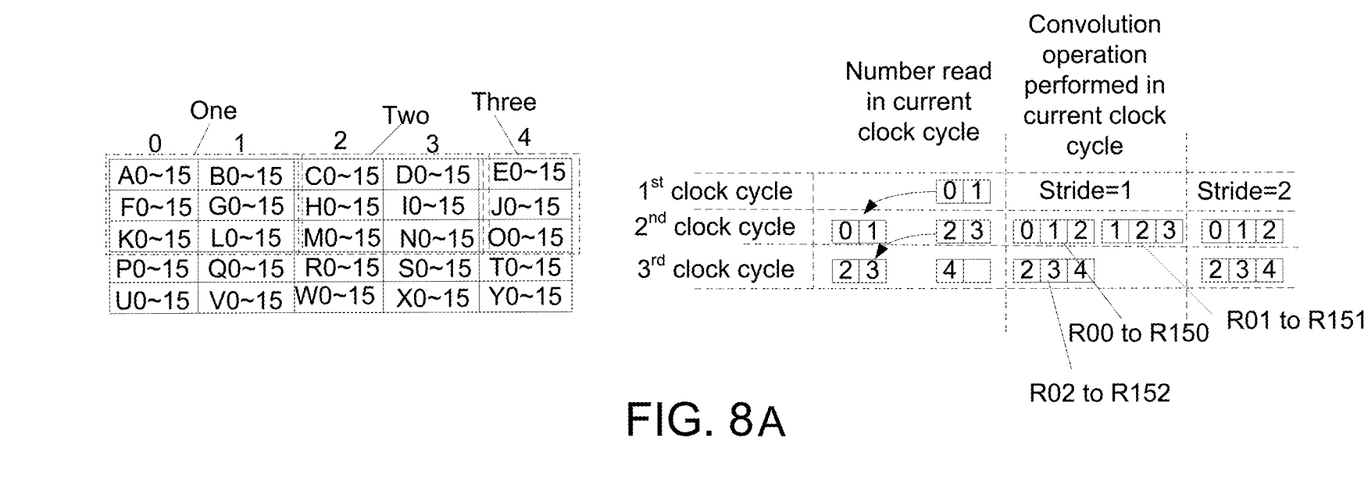
Figure 8B:
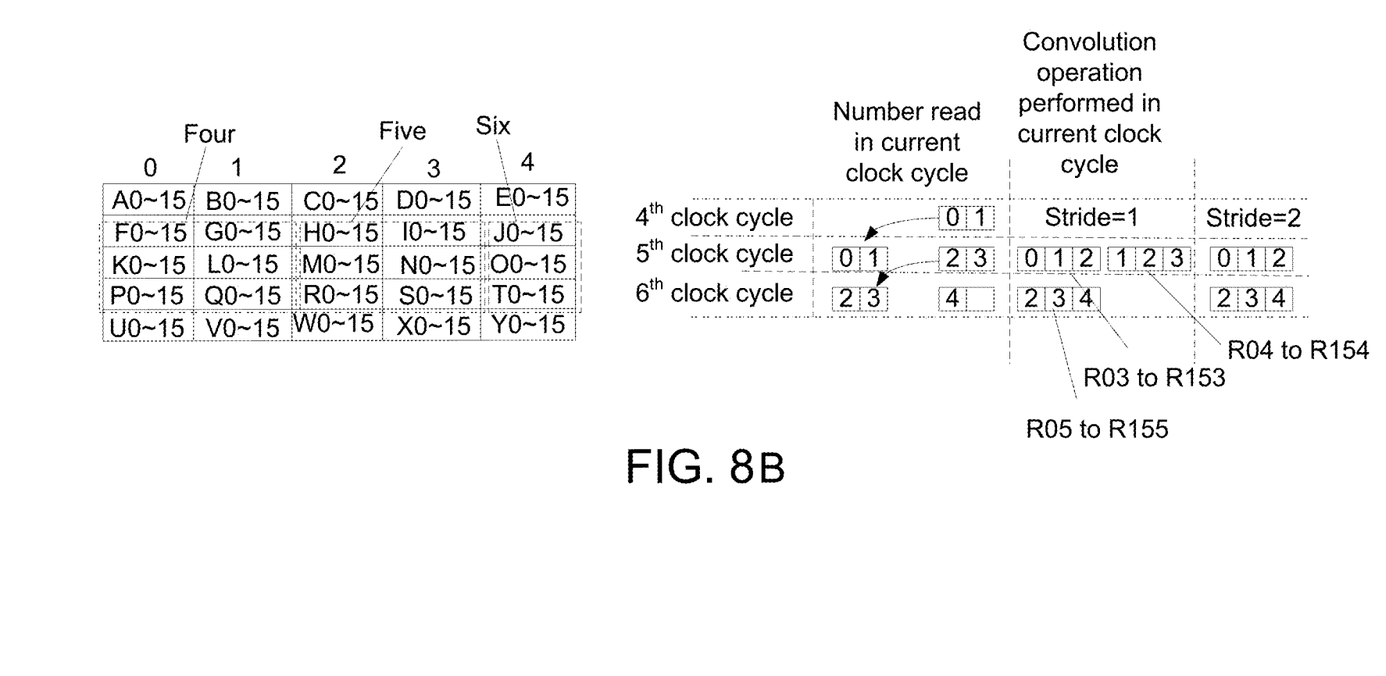
Figure 8C:
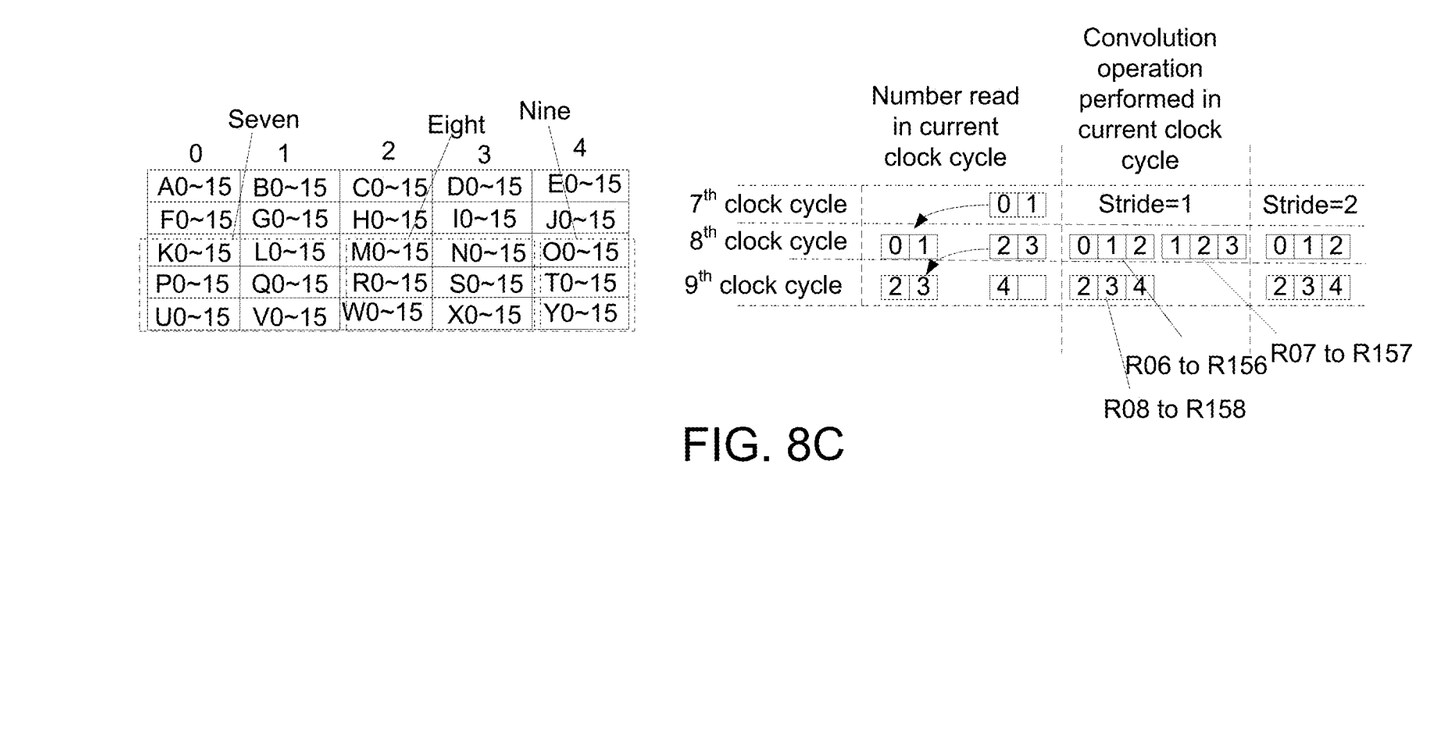

The convolution operation process according to an embodiment of the present invention is described in detail with reference to FIG. 8a to FIG. 8c below. FIG. 8a to FIG. 8c show schematic diagrams of data reading and convolution operation processes according to an embodiment of the present invention.

As shown in FIG. 8a, when the convolution unit reads data in a memory, address 0 of all memories 0 to 5 are read in the first clock cycle to obtain the $0^{th}$ column and the $1^{st}$ column of the feature data in FIG. 8a, and the data of the $0^{th}$ column and the $1^{st}$ column is temporarily stored to the first buffer 161.

In the second clock cycle, address 1 of memories 0 to 5 are read to obtain the $2^{nd}$ column and the $3^{rd}$ column of the feature data in FIG. 8a, and the data of the $2^{nd}$ column and the $3^{rd}$ column is temporarily stored to the second buffer 162. At this point, the data in the first buffer 161 and the second buffer 162 can start to undergo the convolution operation. Using the data reordering unit 163, the first buffer 161 and the second buffer 162 combine and output the $0^{th}$, $1^{st}$ and $2^{nd}$ columns to the first convolution operation circuit 164, and at the same time combine and output the $1^{st}$, $2^{nd}$ and $3^{rd}$ columns to the second convolution operation circuit 165.

In the third clock cycle, address 2 of memories 0 to 5 are read to obtain the $4^{th}$ data of the feature data in FIG. 8a, and the data of the $4^{th}$ column is temporarily stored to the first buffer 161. At this point, using the data reordering unit 163, the first buffer 161 and the second buffer 162 combine and output the $2^{nd}$, $3^{rd}$ and $4^{th}$ columns to the first convolution operation circuit 164, and at the same time combine and output the $3^{rd}$, $4^{th}$ and $x^{th}$ columns to the second convolution operation circuit 165.

Since the feature data in FIG. 8a does not exist in the $5^{th}$ column, the second convolution operation circuit 165 does not need to perform operation in the third clock cycle; however, for an embodiment in which the feature data is in a larger scale, the process of the second clock cycle needs to be repeated until the sliding window has completely traversed the row direction of the feature data. Moreover, the data read in two adjacent clock cycles should be temporarily stored in an alternate manner to the first buffer 161 and the second buffer 162.

At this point, the convolution of the $1^{st}$ to $3^{rd}$ rows of the feature data is complete, and the sliding window should move downward by one stride to continue the convolution of the $2^{nd}$ to $4^{th}$ rows of the feature data. As shown in FIG. 8b, address 3 of memories 0 and 1 and address 0 of memories 2 to 5 are read in the fourth clock cycle, and the $0^{th}$ column and the $1^{st}$ column of the feature data in FIG. 8b are the obtained, and the data of these two columns is temporarily stored to the first buffer 161.

In the fifth clock cycle, address 4 of the memories 0 and 1 and address 1 of memories 2 to 5 are read, and so the $2^{nd}$ column and the $3^{rd}$ column of the feature data in FIG. 8b are the obtained, and the data of these two columns is temporarily stored to the second buffer 162. Also at this point, using the data reordering unit 163, the first buffer 161 and the second buffer 162 combine and output the $0^{th}$, $1^{st}$ and $2^{nd}$ columns to the first convolution operation circuit 164, and at the same time combine and output the $1^{st}$, $2^{nd}$ and $3^{rd}$ columns to the second convolution operation circuit 165.

In the sixth clock cycle, address 5 of memories 0 and 1 are read and address 2 of memories 2 to 5 are read, and so the $4^{th}$ column of the feature data in FIG. 8b is obtained, and the data of this column is temporarily stored to the first buffer 161. At this point, using the data reordering unit 163, the first buffer 161 and the second buffer 162 combine and output the $2^{nd}$, $3^{rd}$ and $4^{th}$ columns to the first convolution operation circuit 164 and at the same time combine and output the $3^{rd}$, $4^{th}$ and $x^{th}$ columns to the second convolution operation circuit 165.

Similar to the convolution of the $1^{st}$ to $3^{rd}$ rows of the feature data, the data read in two adjacent clock cycles should be temporarily stored in an alternate manner to the first buffer 161 and the second buffer 162.

At this point, convolution of the $2^{nd}$ to $4^{th}$ rows of the feature data is complete, and the sliding window should move downward by one stride to continue the convolution the $3^{rd}$ to $5^{th}$ rows of the feature data. As shown in FIG. 8c, the process is similar to that described above, and associated details are omitted herein.

It can also be discovered from the above that, reading of the feature data is similar to a ping-pong operation; the address range of every three rows of the feature data in the memory is set as one address section, and the two adjacent 3-row address sections then form a ping-pong address section. In this embodiment, the $1^{st}$ to $3^{rd}$ rows of the feature data are set as address section 0, the $4^{th}$ to $6^{th}$ rows of the feature data are set as address section 1, and each time the sliding window of the filter moving one stride downward is one set of convolution operations. As such, the regularity is indicated as in table 1 below:

TABLE 1

|  | Memories 4 and 5 | Memories 2 and 3 | Memories 0 and 1 |
| --- | --- | --- | --- |
| First set of convolution | 0 | 0 | 0 |
| Second set of convolution | 0 | 0 | 1 |
| Third set of convolution | 0 | 1 | 1 |
| Fourth set of convolution | 1 (0) | 1 (0) | 1 (0) |
| Fifth set of convolution | 0 | 0 | 1 |
| Sixth set of convolution | 0 | 1 | 1 |
| . . . | . . . | . . . | . . . |

Further, when the stride is 1, the convolution results generated by the first convolution operation circuit 164 and the second convolution operation circuit 165 are the final convolution results; when the stride is 2, the result generated by the first convolution operation circuit 164 is the final convolution result.

The memories mentioned above may be a single-port static random access memory (SRAM), or may be a dual-port SRAM. In case of a dual-port SRAM, the efficiency of depth convolution operation is further enhanced.

Figure 9:
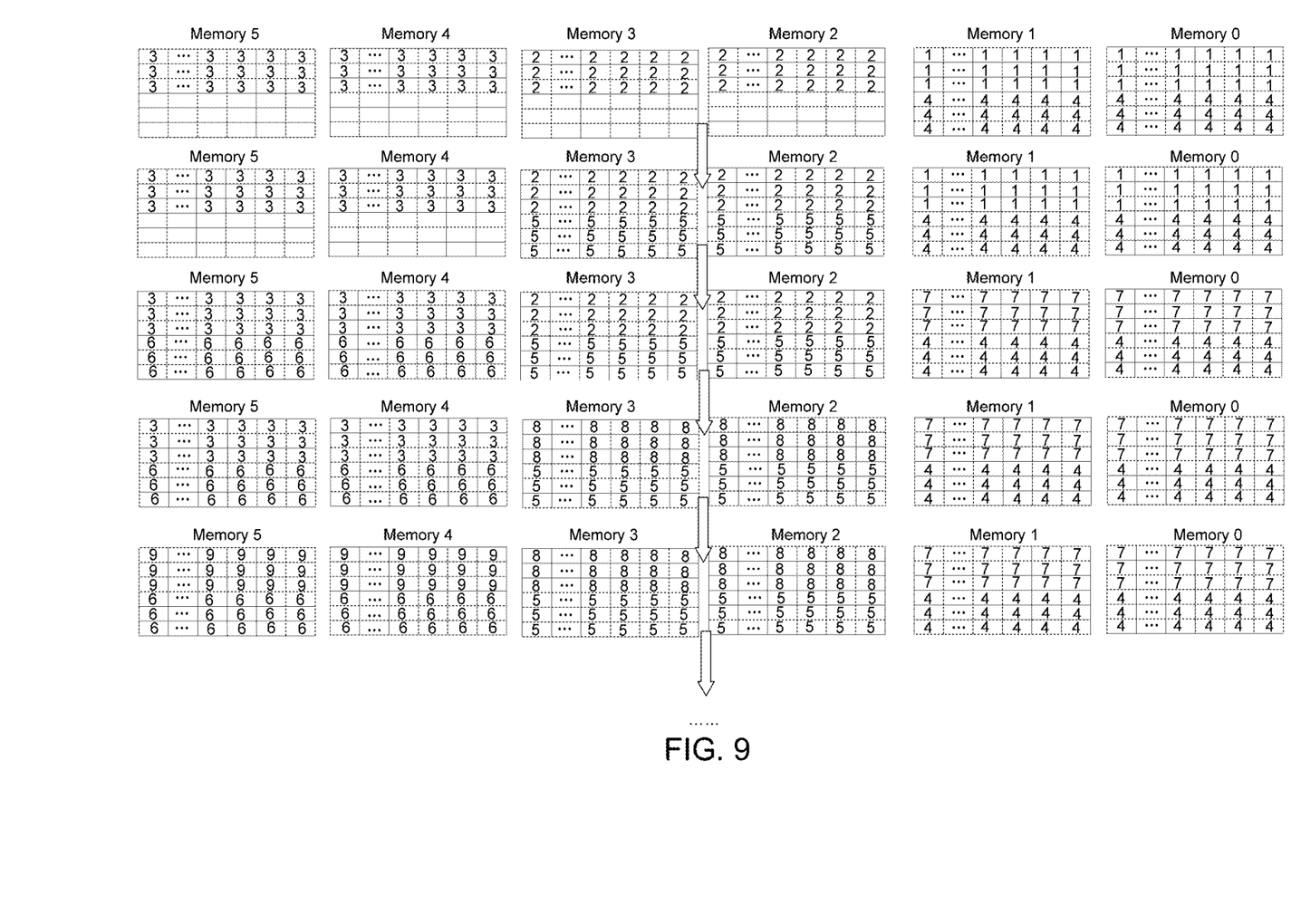
FIG. 9 is a schematic diagram of another type of data reading according to an embodiment of the present invention.

Refer to FIG. 9 showing a schematic diagram of another type of data reading according to an embodiment of the present invention. As shown in FIG. 9, the $1^{st}$ to $3^{rd}$ rows of the feature data are first moved into a memory by a moving unit, and the convolution operation circuits later perform the convolution operations according to the solutions above. At the same time, the moving unit may simultaneously execute a moving instruction during the process of the convolution operation to move the $4^{th}$ row of the feature data to the memory. In contribution to the dual-port SRAM, the writing operation of the moving unit with respect to the memory does not affect the reading operation of the convolution operation circuits with respect to the memory.

In an ideal situation, if the moving unit has exactly completed moving the feature data in the $4^{th}$ row when the convolution operation circuit completes the convolution operation of the $1^{st}$ to $3^{rd}$ rows of the feature data, the convolution operation circuit may then immediately perform the convolution operation of the $2^{nd}$ to $4^{th}$ rows of the feature data, such the convolution operation circuit achieves an seamless effect and hence conceals the time consumed by the moving unit for moving data. When the convolution operation circuit performs the convolution operation of the $2^{nd}$ to $4^{th}$ rows, the moving unit simultaneously performs the moving task for the $5^{th}$ row, and so forth, until the convolution operation is complete for the entire feature data. For the purpose of saving storage spaces of a memory, when the convolution operation circuit performs the convolution operation of the $4^{th}$ to $6^{th}$ rows and the moving unit moves the $7^{th}$-row data, the moving unit should overwrite and store the $7^{th}$-row data to the position of the $1^{st}$-row data. Similarly, the $8^{th}$-row data is overwritten to the position of the $2^{nd}$-row data, and the $9^{th}$-row data is overwritten to the position of the $3^{rd}$-row data.

With the data moving, data reading and convolution approaches above, the operation apparatus of an embodiment of the present invention implements in parallel data moving of the moving unit and the convolution operation, achieving a ping-pong operation of convolution operation circuits and enhancing convolution efficiency, while reducing memory costs since configuring two data storage spaces in a memory is not necessary.

Figure 10:
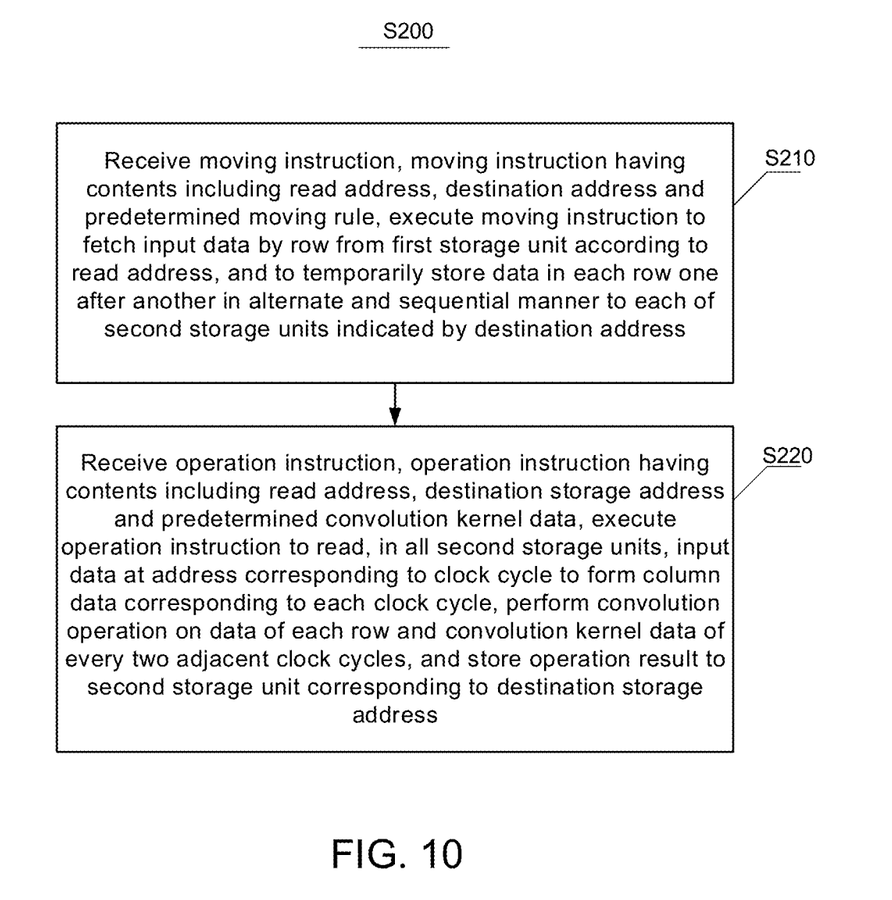
FIG. 10 is an illustrative flowchart of an operation method according to another embodiment of the present invention.

Refer to FIG. 10 showing an illustrative flowchart of an operation method S200 according to another embodiment of the present invention. The operation method according to another embodiment of the present invention is described with reference to FIG. 10 below. The operation method is suitable for the operation apparatus described above, wherein the specific structures and associated details of the operation apparatus can be referred from the disclosure above, and is omitted herein.

As shown in FIG. 10, the operation method S200 includes the following steps.

In step S210, a moving instruction is received, the moving instruction having contents including a read address, a destination address and a predetermined moving rule, and the moving instruction is executed to fetch input data by row from a first storage unit according to the read address, and the data in each row is temporarily stored in an alternate and sequential manner to each of second storage units indicated by the destination address.

In step S220, an operation instruction is received, the operation instruction having contents including a read address, a destination storage address and predetermined convolution kernel data, the operation instruction is executed to read, in all the second storage units, the input data at addresses corresponding to clock cycles by following a sequence of the clock cycles according to the read address to form column data corresponding to each clock cycle, a convolution operation is performed on the column data and convolution kernel data of every two adjacent clock cycles, and the operation result is stored to the second storage unit corresponding to the destination storage address.

In some selective embodiments, the step of reading the input data, in all the second storage units, at the addresses corresponding to the clock cycles by following the sequence of the clock cycles according to the read address to form column data corresponding to each clock cycle, and performing the convolution operation performed on the column data and convolution kernel data of every two adjacent clock cycles further includes: reading the data at $N^{th}$ address of all the second storage units in an $M^{th}$ clock cycle to obtain $P^{th}$-column data, and temporarily storing the $P^{th}$-column data to a first buffer; reading the data at $(N+1)^{th}$ address of all the second storage units in an $(M+1)^{th}$ clock cycle to obtain $(P+1)^{th}$-column data, and temporarily storing the $(P+1)^{th}$-column data to a second buffer; respectively reordering and combining the $P^{th}$-column data and the $(P+1)^{th}$-column data according to a predetermined rule to obtain first combined column data and second combined column data, and outputting the first combined column data to the first convolution operation circuit and outputting the second combined column data to the second convolution circuit; and performing convolution operations on the first combined column data and the second combined column data, respectively, where M, N and P are positive integers greater than or equal to 1.

In some selective embodiments, the $P^{th}$-column data includes data of multiple $P^{th}$ sub-rows, and the $(P+1)^{th}$-column data includes data of multiple $(P+1)^{th}$ sub-rows, wherein the step of reordering and combining the $P^{th}$-column data and the $(P+1)^{th}$-column data according to a predetermined rule to obtain first combined column data and second combined column data further includes: reordering and combining data in at least one row of the multiple $(P+1)^{th}$ sub-rows and the data of multiple $P^{th}$ sub-rows to obtain the first combined column data, and reordering and combining data in at least one row of the multiple $P^{th}$ sub-rows and the data of the multiple $(P+1)^{th}$ sub-rows to obtain the second combined column data.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded with the broadest interpretation so as to encompass all such modifications and similar arrangements and procedures.

What is claimed is:

1. A data temporary storage apparatus, temporarily storing input data in a first storage memory to a plurality of second storage memories, the apparatus comprising:
    a moving circuit, individually coupled to the first storage memory and the second storage memories, receiving a moving instruction, the moving instruction having contents comprising a read address, a destination address and a predetermined moving rule; the moving circuit further executing the moving instruction to fetch input data by row from the first storage memory according to the read address, and to temporarily store one after another in an alternate and sequential manner the input data in each row to each of the second storage memories indicated by the destination address.

2. The data temporary storage apparatus according to claim 1, wherein the step of the moving circuit temporarily storing one after another in an alternate and sequential manner the input data in each row to each of the second storage memories indicated by the destination address comprises:
    temporarily storing one after another in a sequential manner the input data on a same position in each row to a same row of a same second storage memory of the second storage memories; and
    temporarily storing one after another in a sequential manner the input data on a different position in each row to another row different from the same row in the same second storage memory among the second storage memories, or temporarily storing one after another in a sequential manner to the same row of another second storage memory different from the same second storage memory among the second storage memories.

3. The data temporary storage apparatus according to claim 1, wherein each of the second storage memories comprises a first input port and a second input port; wherein the moving circuit temporarily stores the input data to the second storage memories selectively through the first input port and the second input port.

4. The data temporary storage apparatus according to claim 1, wherein the moving circuit simultaneously executes the moving instruction during process of performing a convolution operation.

5. A data temporary storage method, for temporarily storing input data in a first storage unit to a plurality of second storage units, the method comprising:
receiving a moving instruction, the moving instruction having contents comprising a read address, a destination address and a predetermined moving rule; and
executing the moving instruction to fetch the input data by row from the first storage unit according to the read address, and to temporarily store one after another in an alternate and sequential manner the input data in each row to each of the second storage units indicated by the destination address.

6. The data temporary storage method according to claim 5, wherein the step of temporarily storing one after another in an alternate and sequential manner the input data in each row to each of the second storage units indicated by the destination address comprises:
temporarily storing one after another in a sequential manner the input data on a same position in each row to a same row of a same second storage unit among the second storage units; and
temporarily storing one after another in a sequential manner the input data on a different position in each row to another row different from the same row in the same second storage unit among the second storage units, or sequentially storing one after another in a sequential manner to the same row in another second storage unit different from the same storage unit among the second storage units.

7. The data temporary storage method according to claim 5, wherein each of the second storage unit comprises a first input port and a second input port, and the step of temporarily storing one after another in an alternate and sequential manner the input data in each row to each of the second storage units indicated by the destination address comprises:
temporarily storing one after another in an alternate and sequential manner data in each row to each of the second storage units indicated by the destination address selectively through the first input port and the second input port.

8. The data temporary storage method according to claim 5, wherein the moving instruction is simultaneously executed during a process of performing a convolution operation.

9. An operation method, applied to a convolution operation apparatus, for performing a convolution operation on input feature data, the input feature data stored in a storage unit and corresponding to a data structure consisting of I*J planar data of N channels, where N, I and J are positive integers, the convolution operation apparatus comprising a first buffer, a second buffer and a first convolution unit, the operation method comprising:
writing, in the input feature data, N sets of data corresponding to a $j^{th}$ position of an $i^{th}$ row of the N channels to the first buffer;
writing, in the input feature data, the N sets of data corresponding to a (j+1)th position of the $i^{th}$ row of the N channels to the second buffer; and
reading data corresponding to an $n^{th}$ channel from the first buffer and the second buffer to the first convolution unit to perform the convolution operation;
where i is a positive integer smaller than or equal to I, j is a positive integer smaller than or equal to J, and n is a positive integer smaller than or equal to N.

10. The operation method according to claim 9, the convolution operation apparatus further comprising a second convolution unit, the operation method further comprising:
reading data corresponding to an $m^{th}$ channel from the first buffer and the second buffer to the second convolution unit to perform the convolution unit, where m is a positive integer smaller than or equal to N.

11. The operation method according to claim 9, further comprising:
reordering the data corresponding to the $n^{th}$ channel read from the first buffer and the second buffer to satisfy convolution operation requirements of the first convolution unit.

* * * * *